United States Patent [19]

Watson

[11] Patent Number: 5,038,632

[45] Date of Patent: Aug. 13, 1991

[54] TRANSMISSION SHIFT LEVER BIASING ASSEMBLY

[75] Inventor: Rick D. Watson, Lambertville, Mich.

[73] Assignee: Dana Corporation, Toledo, Ohio

[21] Appl. No.: 454,089

[22] Filed: Dec. 19, 1989

[51] Int. Cl.$^5$ .................. B60K 20/00; F16H 59/00
[52] U.S. Cl. .................................. 74/475; 74/477;
74/527
[58] Field of Search ................ 74/475, 477, 527, 532

[56] References Cited

U.S. PATENT DOCUMENTS

| 1,830,797 | 11/1931 | Lapsley | 74/475 |
| 2,266,397 | 12/1941 | Norelius | 74/333 |
| 3,164,030 | 1/1965 | Fodrea et al. | 74/475 |
| 3,541,879 | 11/1970 | Rauenel | 74/477 |
| 3,602,245 | 8/1971 | Miesel | 74/527 X |
| 3,790,129 | 2/1974 | Pauls | 74/527 X |
| 4,510,818 | 4/1985 | Inui | 74/477 |
| 4,567,785 | 2/1986 | Reynolds et al. | 74/477 |
| 4,827,793 | 5/1989 | Loeffler et al. | 74/477 |

FOREIGN PATENT DOCUMENTS

| 1168074 | 12/1958 | France | 74/475 |
| 54-0019049 | 2/1979 | Japan | 74/475 |
| 55-0103157 | 7/1980 | Japan | 74/475 |

Primary Examiner—Allan D. Herrmann
Assistant Examiner—David W. Laub
Attorney, Agent, or Firm—F. B. McDonald

[57] ABSTRACT

A transmission shift lever biasing assembly includes a plunger pin having a shoulder, the pin containing a plurality of reduced diameter detent grooves along its longitudinal axis at an end opposite the shoulder. Each groove defines a pair of opposed ramps, and an end cap is adapted to receive and contain a portion of the plunger containing the grooves and ramps. An annular pusher element surrounds the plunger pin, and includes angled cam surfaces adapted to engage a plurality of balls interposed between the pusher element and an end face of the housing. The pusher element bears against the balls by means of a spring contained within the housing. The spring is seated on the shoulder of the plunger pin and bears against the pusher element to urge the balls into one of the detent grooves corresponding to a selected shift rail.

6 Claims, 3 Drawing Sheets

TRANSMISSION SHIFT LEVER BIASING ASSEMBLY

BACKGROUND OF THE INVENTION

This invention relates to apparatus for biasing a transmission shift lever relative to a plurality of shift rails within a transmission. More particularly, the invention relates to the use of a plunger pin system designed to minimize reactive or "kick out" forces on the lever during selection of a rail.

The use of spring loaded plunger pins for achieving shift lever biasing is not new. Such devices are typically employed to align a shift lever with a "preferred" rail whenever the transmission is in neutral. Such devices also enhance the "feel" of selection, or provide "rail definition" to improve the ergonomics of the shifting process, particularly appreciated in the shifting of heavy duty truck transmissions.

Very few heavy duty transmission designs, however, provide for a noticeable force relief or "breakthrough" feel whenever a new rail position is selected. In the past, those which have been designed to provide such a feel have been expensive to manufacture. Moreover, typical breakthrough designs involve only springs and plungers, which tend to increase rather than to decrease the "kick out" forces associated with selections of chosen rails.

SUMMARY OF THE INVENTION

The transmission shift lever biasing assembly disclosed herein provides a spring biased detent system which diminishes the "kick out" forces produced by a conventional plunger pin compression system. The present lever biasing assembly also provides a "breakthrough" shift feel whenever a new rail is selected. The assembly includes a pusher element having angled cam surfaces which cooperate with a spring to urge a plurality of balls into selective annular detent grooves oriented along the longitudinal axis of a plunger pin.

In a preferred form, the assembly includes a shift rail bracket, a shift interlock movable within the bracket, and a shift lever adapted for interfacing with the interlock for selection of any one of a plurality of transmission shift rails. Positioned transversely to the rails and adapted for movement with the shift lever via the interlock, the plunger pin contains a shoulder and a plurality of reduced diameter detent grooves at an end opposite the shoulder. Each groove defines a pair of opposed ramps, and a fixed end cap is adapted to react with and contain a portion of the plunger pin which includes the grooves and ramps. An annular pusher element surrounds the plunger pin and bears against a plurality of balls retained within the end cap by means of a spring located about the pin and extending axially between the pusher element and shoulder of the plunger pin. Cam surfaces on the pusher operates to urge the balls into one of the detent grooves corresponding to a selected shift rail.

DETAILED DESCRIPTION OF A PREFERRED EMBODIMENT

Figure 1:
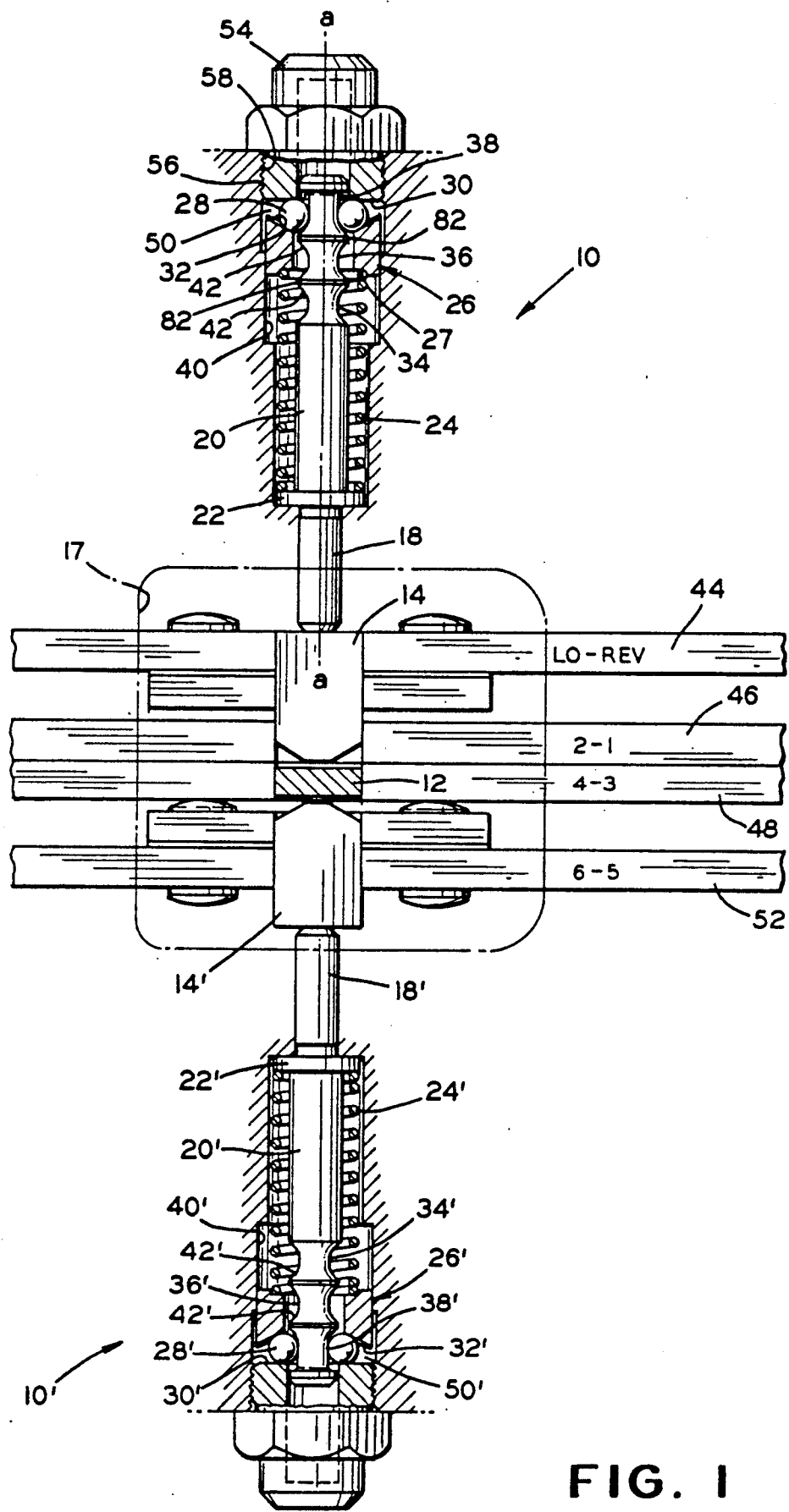
FIG. 1 is a cross sectional plan view of the transmission shift lever biasing assembly of the present invention.

Referring initially to FIG. 1, a shift lever biasing assembly 10 includes a shift lever finger 12 which operates through interlocks 14 supported within a bracket (not shown). The interlock end 18 of a plunger pin 20, as viewed through a transmission shift tower opening 17, is shifted conventionally by the finger 12 via the interlock 14, as will be appreciated by those skilled in the art.

A plurality of balls 28 are symmetrically disposed about a longitudinal axis "a—a" of the plunger pin 20, and in the preferred embodiment, two such balls are positioned 180 degrees apart. Symmetrical positioning of the balls tends to avoid cocking of the pin 20 due to uneven side loading of the pin by the balls.

The plunger pin 20 contains an annular shoulder 22 adapted for biasing a coiled compression spring 24 against an annular pusher element 26. The element 26, positioned to transfer the force of the spring 24 directly to the balls 28, is supported for movement in a cylindrical bore 40 drilled through a transmission housing wall (not shown). The pusher element is urged by the compression spring 24 into the balls 28 which bear, in turn, against a flat bottom end face 30 of an end cap 54. The end cap 54 is threaded into the bore 40 via a threaded exterior surface portion 56 which engages a matingly threaded portion 58 of the bore 40. The end face 30 has a surface perpendicular to the axis a—a of the plunger pin 20 and end cap 54.

The pusher element 26 contains an angled cam surface 32 which operates to urge the balls radially inwardly toward the axis a—a of the plunger pin and into the detent grooves 34, 36, and 38. At the opposite end of the pusher element 26, spaced from the cam surface 32, is formed an annular flat bearing surface 27. The latter surface, also perpendicular to the axis a—a, is adapted for engagement by the compression spring 24, preferably a coil spring.

Each detent groove defines a pair of opposed ramps 42 over which the balls must be forced in order to permit the lever finger 12 to move to the next selected rail position. As will be noted, the plunger pin groove 34 corresponds to the low-reverse rail 44. The plunger pin groove 36 corresponds to the first-second gear rail 46, while the plunger pin groove 38 corresponds to the third-fourth gear rail 48.

Figure 7:
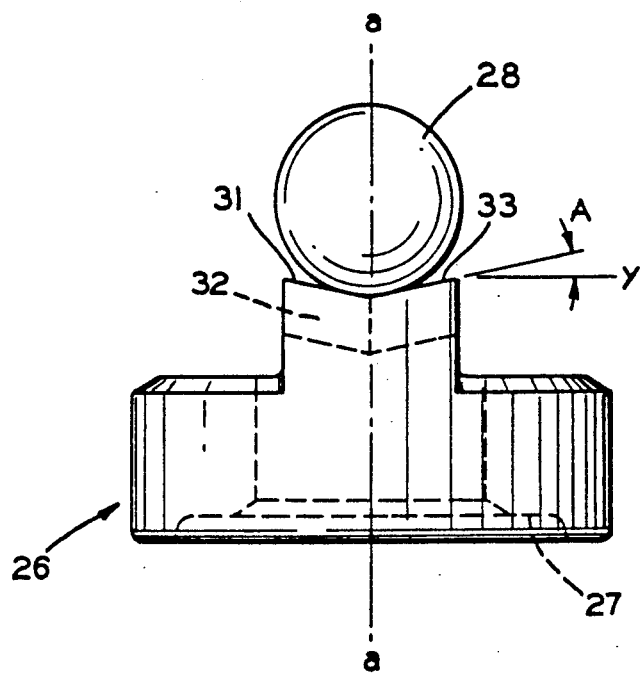
FIGS. 7 and 8 are side views of a preferred embodiment of the pusher employed in FIGS. 1-6.
Figure 8:
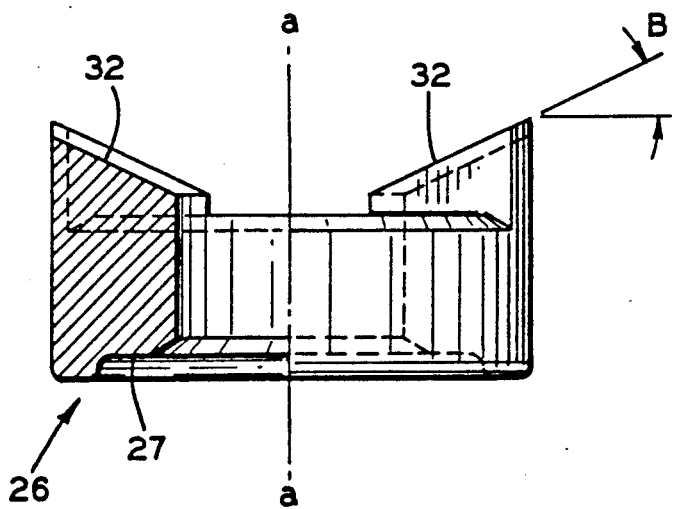

Referring now to FIGS. 7 and 8, the pusher element 26 is shown in greater detail in side views; the element 26 in FIG. 8 shown rotated 90 degrees (about axis a—a) relative to the view of FIG. 7. It will be appreciated by those skilled in the art that the surface 32 is a compound angled surface. Thus, not only is each surface angled inwardly toward the axis a—a (angle B of FIG. 8), but each surface is comprised of two inversely angled segments 31 and 33 (angle A of FIG. 7). The latter design assures that the two balls 28 will remain 180 degrees apart, thus moving on a fixed radial path at all times. The preferred inverse angles A of the surfaces 31 and 33 (as measured from a line Y perpendicular to axis a—a) will range from 8 to 12 degrees (FIG. 7). The angle B of the cam surface 32 will range from 20 to 30 degrees (FIG. 8).

As will also be noted in FIGS. 7 and 8, the bearing surface 27 of the element 26 is recessed in order to assure a satisfactory, uncocked seating of the spring 24.

Figures 2, 3, 4:
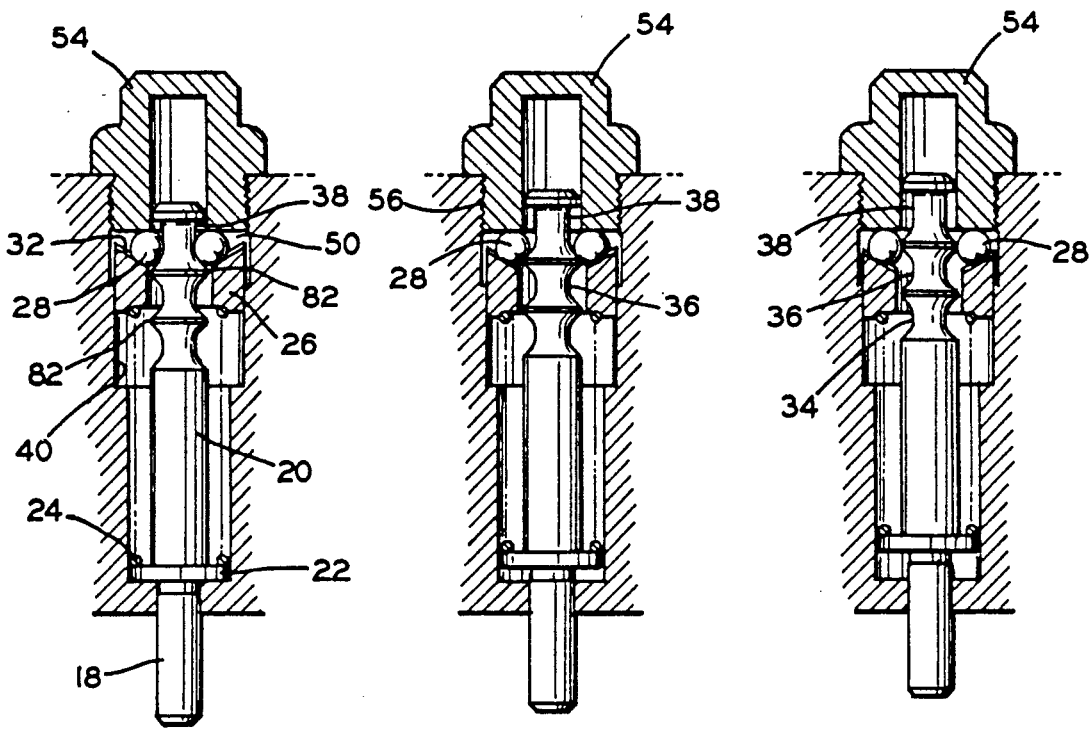
FIGS. 2-6 are sequential views of the plunger pin and end cap apparatus, as the plunger is shifted between three rail positions.

Referring now also to FIGS. 2-6, it will be appreciated that in FIG. 2 the position of the balls 28 in the plunger groove 38 corresponds to the third-fourth gear rail 48. Upon shifting of the lever finger 12 toward the first-second gear rail 46, the plunger pin moves further into the end cap 54 as shown. The ramp 42 of the plunger pin adjacent the groove 38 causes the balls to be urged radially outwardly into the annular space 50 between the cam surface 32 of the pusher element 26 and the bottom end face 30 of the end cap 54. As the balls 28 crest over the adjacent ramps 42 of the grooves 38 and 36, a "breakthrough" feel is achieved to signal the impending transformation from shift rail 48 to shift rail 46 (FIGS. 3 and 4).

Figure 5:
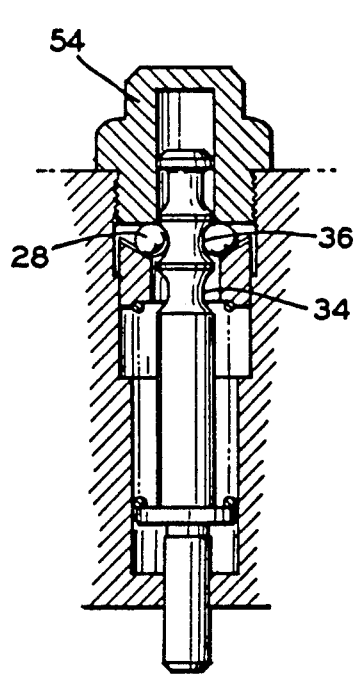

Referring now to FIG. 5, the lever finger is now in the first-second gear rail 46. To the extent that the balls are radially urged into the plunger pin groove 36, it will be appreciated that the "kick out" force will be minimized to the extent that the balls are cam-loaded into the detent groove 36.

Figure 6:
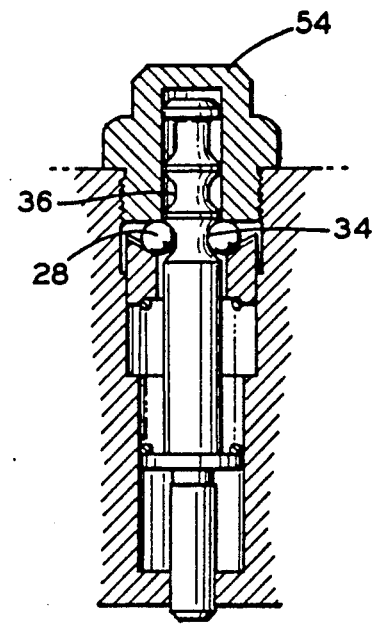

Referring to FIG. 6, the balls 28 engage the plunger pin groove 34, which corresponds with the low reverse gear rail 44. The greater the amount of spring compression, the harder the balls will be held in a given detent groove. Thus, the breakthrough feel will become significantly greater as the lever is shifted from rail 48 to rail 44.

Referring now back to FIG. 1, a second shift lever biasing assembly 10', depicted in the lower half of the drawing, is analogous to the first described assembly 10 in all physical respects. However, in operation, whenever the assembly 10 is operating the assembly 10' will be inactive. Thus, movements between rails 44 and 46 and 48 will cause movement of the plunger pin 20 but will not cause movement of the plunger pin 20'. Conversely, the plunger pin 20' moves only with respect to shifts between rails 48 and 52, during which times the assembly 10 becomes inactive. Those skilled in the art will appreciate that the rail 48 in the described preferred embodiment is a "preferred" rail, or the rail with which the shift lever finger 12 becomes aligned when the transmission shift lever is in neutral. Although only one may be used, for example, if cost reasons might dictate, the use of two biasing assemblies 10, 10' will operate to assure a preferred rail. Thus, without the assembly 10', the plunger end 18 might push the finger 12 over the shift rail 52, or even between rails 48 and 52.

Depending upon the number of shift rails, all of the grooves in both of the assemblies 10, 10' need not always be employed. For example, in the embodiment of FIG. 1, only the grooves 36' and 38' of the assembly 10' are engaged by the balls 28' (during shifts between rails 48 and 52, respectively). The groove 34' is never engaged.

Figure 9:
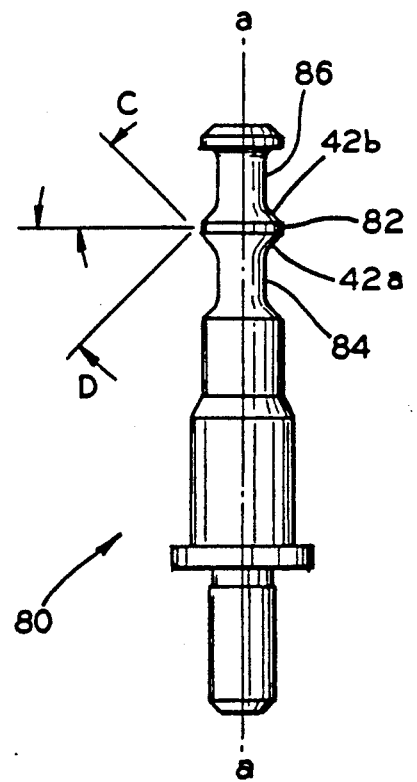
FIG. 9 alternate preferred embodiment of a plunger pin for use in the present invention.

Finally, an alternate embodiment 80 of a plunger pin is shown in FIG. 9, which incorporates only two grooves 84 and 86. The latter design contemplates use in an assembly analogous to that of assembly 10', wherein use of only two detent grooves (36' and 38') is required. The opposed ramps 42 of either plunger pin 20 or 80 have angles which must be determined as a function of desired system performance. Preferably, adjacent opposed ramps 42a and 42b (FIG. 9) are separated by annular flats 82. As a rule, the angle C of ramp 42a positioned below each flat 82 will be greater than the angle D of ramp 42b positioned above each flat 82. In the preferred design of either the pin 20 or pin 80, the angle C will range between 45 and 60 degrees, while the angle D will range between 30 and 50 degrees.

Although only one preferred embodiment has been detailed and described herein, the following claims envision a number of other embodiments not shown or described, but which will fall within the spirit and scope thereof.

What is claimed is:

1. In a transmission shift lever biasing assembly interactive with a plurality of transmission shift rails, said assembly including a shift rail bracket, a shift interlock movable within the bracket, and a shift finger adapted for movement within the bracket for selection of any one of said plurality of shift rails, said assembly further including a plunger pin having an axis positioned transversely to said rails and adapted for movement via said interlock with said shift finger; an improvement comprising detent biasing means including a plunger pin having a shoulder and containing a plurality of axially spaced reduced diameter detent grooves positioned at an end opposite said shoulder, each groove defining a pair of opposed ramps, said detent biasing means further comprising an end cap adapted to receive and contain a portion of said plunger pin containing said detent grooves and ramps, an interior portion of said plunger end cap containing a bottom end face, and an annular pusher element movably disposed within said end cap, said element surrounding said plunger pin, said detent biasing means further comprising a plurality of balls interposed between said pusher element and said end face, a spring seated between said shoulder of said plunger pin and said pusher element to force said balls toward said end face, wherein said pusher element comprises an angled cam surface for each ball to urge said balls into one of said detent grooves corresponding to a selected shift rail, wherein said cam surface is composed, wherein a pair of inversely angled surfaces coact to retain each ball on a fixed radial path at all times.

wherein said balls are symmetrically disposed about said axis of said plunger pin, and wherein sai dbiasing assembly further comprises a second detent biasing means structurally equivalent to said first biasing means, transversely aligned therewith, and independently and non-simultaneously engageable by said shift finger.

2. The transmission shift lever biasing assembly of claim 1 wherein adjacent opposed ramp angles of said plunger pin are unequal.

3. The transmission shift lever biasing assembly of claim 2 wherein said plurality of balls comprises two balls spaced 180 degrees apart about said plunger pin.

4. The transmission shift lever biasing assembly of claim 3 wherein said bottom end face of said end cap is flat, having a surface which lies perpendicularly with respect to said axis of said plunger pin.

5. The transmission shift lever biasing assembly of claim 4 wherein said one end of said pusher element defines an annular flat spring bearing surface spaced from said cam surface, wherein said bearing surface also lies perpendicularly with respect to said axis.

6. The transmission shift lever biasing assembly of claim 1 wherein said first and second detent biasing means operate together to provide a preferred rail.

* * * * *

UNITED STATES PATENT AND TRADEMARK OFFICE
CERTIFICATE OF CORRECTION

PATENT NO. : 5,038,632

DATED : August 13, 1991

INVENTOR(S) : Rick D. Watson

It is certified that error appears in the above-identified patent and that said Letters Patent is hereby corrected as shown below:

In column 4, line 39, the word "composed" should be --compound--.

In column 4, line 44, the words "sai dbiasing" should be --said biasing--.

Signed and Sealed this

Twenty-ninth Day of December, 1992

Attest:

DOUGLAS B. COMER

Attesting Officer

Acting Commissioner of Patents and Trademarks